UNITED STATES PATENT OFFICE.

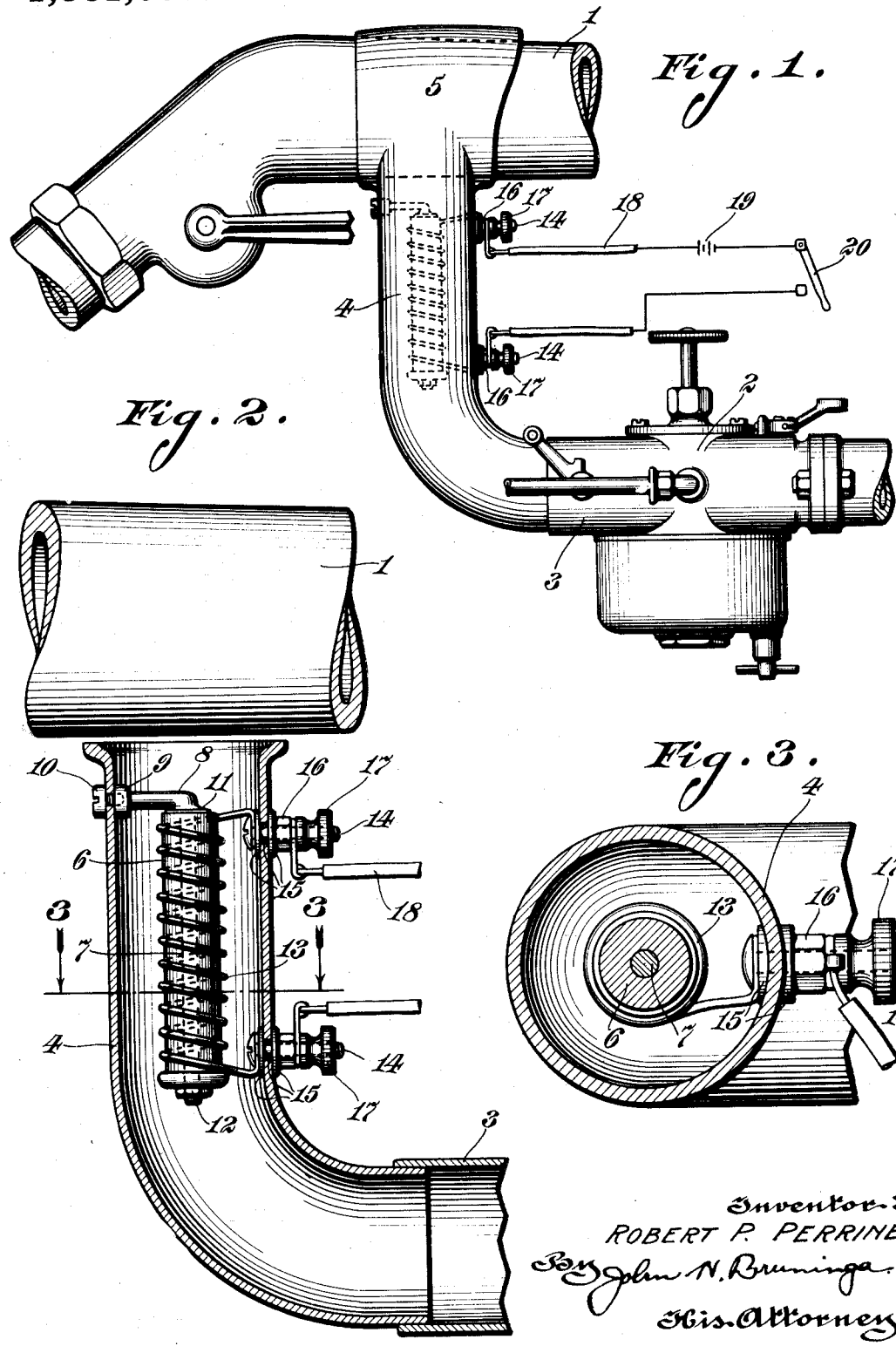

ROBERT P. PERRINE, OF ST. LOUIS, MISSOURI, ASSIGNOR OF ONE-HALF TO THOMAS J. RYAN, OF ST. LOUIS, MISSOURI.

HEATING SYSTEM FOR HYDROCARBON-ENGINES.

1,361,095.  Specification of Letters Patent.  Patented Dec. 7, 1920.

Application filed November 17, 1917. Serial No. 202,635.

*To all whom it may concern:*

Be it known that I, ROBERT P. PERRINE, a citizen of the United States, and residing at St. Louis, Missouri, have invented a new and useful Improvement in Heating Systems for Hydrocarbon-Engines, of which the following is a specification.

This invention relates to hydrocarbon engines, and more particularly to a heating system therefor.

In hydrocarbon engines, it is usual to preheat the air supplied to the carbureter, by passing this air over the exhaust manifold of the engine so as to be heated by the exhaust gases. This is accomplished by providing an air pipe leading from, and sometimes partially enveloping the exhaust manifold, and leading to the air intake of the carbureter. After the engine has been started so that the exhaust manifold is hot, the carbureter will be supplied with hot air, thereby insuring a more complete vaporization of the fuel and a more perfect mixture of this fuel with the air. When the engine is started, the exhaust pipe is cold; the air entering the carbureter, therefore, will be cold. Moreover, the entire engine is at this time cold, so that vaporization of the fuel is imperfect, the mixture is imperfect and the combustion will, therefore, be incomplete.

One of the objects of this invention, therefore, is to provide a system in which the air entering the carbureter, while heated by the exhaust gases during the operation of the engine, will be heated by auxiliary heating means when starting so as to secure complete vaporization and a perfect mixture when starting.

Another object is to provide a system which is simple in construction and operation, cheap to manufacture and which can be readily applied to existing engines.

Further objects will appear from the detailed description taken in connection with the accompanying drawing, in which:

Figure 1 is a side elevation, illustrating the system embodying this invention;

Fig. 2 is an enlarged vertical section through the hot air pipe, showing the heating element embodying this invention; and, Fig. 3 is a section on the line 3—3, Fig. 2.

Referring to the acompanying drawing, 1 designates the exhaust manifold and 2 the carbureter having an air intake connection 3. An air pipe 4 is connected with the intake connection 3 of the carbureter and has a part 5 partially enveloping the exhaust manifold. In this construction, therefore, the air entering the pipe 4 must pass in contact with the exhaust manifold. It will, therefore, be understood that during the operation of the engine and when the exhaust manifold is hot, the air passing through the pipe 4 and into the carbureter will be heated, thereby insuring more perfect vaporization of the fuel, and insuring a more perfect mixture of the gases as delivered to the engine.

In accordance with this invention, there is mounted in the air pipe 4 an auxiliary heating device, which is adapted to be rendered operative or inoperative at the will of the operator, to heat the air when starting. This heating device comprises a core 6 of porcelain or other suitable insulating material, which is perforated to receive the shank 7 of the support 8, provided with a boss 9 which is tapped to receive a screw 10 for attaching the support to the wall of the pipe 4. The support has a flange 11 against which the tube is clamped on the shank 7 by a nut 12. Wound on the core 6 is a resistance wire 13, which is connected at its ends to binding posts 14, secured to and insulated from the wall of the pipe 4. For this purpose the binding posts have mounted thereon washers 15 of asbestos or other suitable insulating material, and nuts 16 to clamp the parts together. The binding posts are provided with knurled nuts 17 to permit the clamping to the same of the supply wires 18. These wires are arranged in circuit with a suitable battery 19, which may be the usual storage battery placed on the automobile, and also connected in this circuit is a suitable switch 20, which may be placed on the dash of the automobile.

In starting the engine, the switch 20 is closed to connect the heating element in circuit with the battery, thereby causing current to flow through this heating element and raise the temperature of this element sufficiently to heat up the air passing through the pipe 4. The entering air will thus be heated so as to supply hot air to the carbureter in starting, and thus insure more perfect vaporization of the fuel and more perfect mixture of the gases supplied to the engine. This will, of course, facilitate starting of the engine. After the engine is started, and after the exhaust manifold has become hot, the switch 20 is opened, and the air will thereafter be heated by the exhaust gases. It will, therefore, be seen that this provides an efficient and simple starting system in which the electric current is used only during starting, while the exhaust gases are thereafter utilized to heat the air supplied to the carbureter.

It is obvious that various changes may be made in the details of construction without departing from the spirit of this invention. It is, therefore, to be understood that this invention is not to be limited to the specific construction shown and described.

Having thus described the invention, what is claimed is:

In a hydrocarbon automobile engine having a carbureter provided with an air intake and having an exhaust manifold, an air pipe leading from the exhaust manifold to the air intake in order to heat the air supplied to the carbureter, by the exhaust gases, during the regular operation of the engine; an electrical heating element arranged in said pipe, and a switch accessible to the driver, adapted to close the circuit of said element in order to electrically heat the air supplied to the carbureter when starting and adapted to open the circuit of said element after the engine has started.

In testimony whereof I affix my signature this 17th day of October, 1917.

ROBERT P. PERRINE.